United States Patent Office 3,145,108
Patented Aug. 18, 1964

3,145,108
SHORTENING PRODUCT
Norman Bratton Howard, Hamilton, Ohio, assignor to
The Procter & Gamble Company, Cincinnati, Ohio, a
corporation of Ohio
No Drawing. Filed May 4, 1961, Ser. No. 107,633
19 Claims. (Cl. 99—118)

This invention relates to new and improved shortenings. More particularly, it relates to glyceride fat compositions having superior baking qualities as compared with those which have been previously known.

Ordinary cake baking has customarily been a time consuming and complicated job. Preparing the batter has ordinarily involved a number of mixing steps in which the various ingredients are incorporated into the batter according to involved instructions contained in a recipe. In the most common methods of cake baking, sugar and fat are creamed together, and then the additional ingredients are added in an order that may involve either many separate mixing steps or adding ingredients in a specified order while mixing. It has not been possible, prior to this invention, to simply mix all of the ingredients from almost any cake recipe together in a single step and bake an acceptable cake.

Dry prepared cake mixes have greatly simplified cake baking operations, but many housewives still prefer to bake their own cakes. Although a housewife simply adds liquid to a dry prepared mix to form a batter, this simplicity of procedure is obtained at the cost of variety. The prepared mixes offer a limited choice of cakes, and it is very difficult to add additional ingredients to a prepared mix without severely affecting the quality of the cake. Therefore, a housewife who prefers to use either a particular recipe or particular ingredients may not choose a prepared mix despite the difficulties associated with preparing a batter from many components.

It has now been found that the addition of certain combinations of emulsifiers and high temperature batter stabilizers to a fatty triglyceride will produce a shortening which can be used in a wide variety of recipes with the result that acceptable cakes can be achieved with single-stage mixing in which all the ingredients are added to the mixing bowl at the same time. The cakes prepared by this single-stage mixing are not only superior to cakes prepared with conventional shortenings by single-stage mixing, but are often superior to cakes made with conventional shortenings by conventional procedures.

Accordingly it is an object of this invention to provide a shortening which has improved cake-baking properties over prior art shortenings.

It is a further object to provide a shortening which can be used to prepare a cake batter with only a single mixing step.

Other objects and advantageous features will be apparent from the following detailed description.

In general, shortenings of this invention comprise a fatty triglyceride having a liquid oil phase. From about 1.5% to about 12% by weight of the total shortening of monoester of saturated fatty acid with straight chain aliphatic diol is dissolved in this liquid oil phase to act as an emulsifier. The diol can have from three to five carbon atoms and the fatty acid can have from 16 to 22 carbon atoms. Mixtures of esters can be used.

The fatty triglyceride also contains from about 0.25% to about 4% by weight of the total shortening of material selected from the following high temperature batter stabilizers: (1) saturated fatty acids containing from 14 to 22 carbon atoms; (2) the condensation product of either a fatty acid monoglyceride, a fatty acid diglyceride, a mixture of partial fatty acid glycerides, or a monoester of a straight chain aliphatic diol with a saturated fatty acid having from 14 to 22 carbon atoms with a polycarboxylic acid which has from zero to four hydroxy groups, said condensation product having at least one free carboxyl group per molecule (the polycarboxylic acid contains from three to six carbon atoms, the diols contain from three to five carbon atoms, the fatty acid radicals in the glycerides are acyl chains containing from 14 to 22 carbon atoms, and the condensation products containing said glycerides can have an iodine value not higher than 60); (3) the condensation product of a saturated fatty acid containing from 14 to 22 carbon atoms with a polycarboxylic acid having from one to four hydroxy groups, said condensation product having at least one free carboxyl group per molecule (the polycarboxylic acid can contain from three to six carbon atoms); and (4) the condensation product of a saturated straight chain fatty alcohol containing from 14 to 22 carbon atoms with a dicarboxylic acid having no hydroxy groups and containing from three to six carbon atoms, said condensation product having at least one free carboxyl group per molecule.

As will subsequently be seen from the examples, some variation in both directions from the stated limits is possible or even desirable in certain cases and under certain conditions and the term "about" is used herein to allow for such variations.

As used herein, the term "condensation product" is intended to cover the reaction product in which ester groups form as a result of the reaction of the recited components. These condensation products can be made in various ways. For instance, the condensation product of a monoglyceride with a polycarboxylic acid could be made by reacting glycerine, a fatty acid, and the polycarboxylic acid as well as by reacting the monoglyceride and the polycarboxylic acid. In such reactions the ratios of the materials and the conditions are chosen so that the end product will contain the specific ester desired, but there will also be various other compounds produced. It is not intended that this invention should be limited to a particular method of preparation of any material.

In order to conveniently describe the invention in detail, it is necessary to arbitrarily divide the cake baking process into two separate parts. In the first part which comprises the mixing step, one of the major problems concerns the incorporation of air into the batter in the form of small bubbles. The incorporation of air is essentially the production of a foam, and the presence of an oily or fatty phase tends to harm the foam building tendency of the protein fraction of the cake. Although it is not desired to be bound by theory, it is felt that the emulsifiers prevent the oily phase from acting as a foam depressant by forming a film at the oil-aqueous phase interface. It is felt that this property of film formation is related to the oil-aqueous phase interfacial tension since a film is formed at that concentration of emulsifier where an addition of emulsifier ceases to decrease the apparent interfacial tension and begins to increase the apparent interfacial tension. (Interfacial tension measurements were made with a Du Nouy tensiometer for this invention.) This concentration varies with temperature as well as composition of the oily phase for any given emulsifier. As temperature increases the minimum concentration necessary to form a film also increases.

Since the effectiveness of the emulsifier depends upon its being dissolved in the liquid oily phase, the upper limit of effective concentration is determined by the solubility of the emulsifier in the liquid oily phase. This requirement that the emulsifier be dissolved in the liquid oily phase means that processing of the shortening may require an elevation of temperature and/or prolonged holding times to dissolve the additives.

Again, although it is not desired to be bound by theory, the film forming tendency of the emulsifier is apparently related, at least in part, to the crystalline structure of the emulsifier at the temperature of mixing. The preferred structure is the α-phase structure which is ordinarily unstable in relation to the β- or β'-phase structure. These crystalline phases are described in U.S. Patents 2,521,242 and 2,521,243, issued September 5, 1950. While not all materials having an α-phase structure are effective, it has been noted that certain materials which enhance the α tendencies of certain emulsifiers also increase the effectiveness of those same emulsifiers in increasing air incorporation in the mixing step. Examples of such materials include stearic acid, propylene glycol distearate, and tristearin.

The compounds which enhance the effectiveness of the emulsifier in aiding air incorporation are in some instances also capable of performing other functions. For instance, stearic acid, which enhances air incorporation when used with propylene glycol monostearate, will also act as a high temperature batter stabilizer. Other compounds such as propylene glycol distearate and tristearin do not act as high temperature stabilizers or as emulsifiers, but do enhance air incorporation when used with the diol ester emulsifiers in amounts from 0.25% by weight of the total shortening to the percent where the liquid phase of the shortening is saturated.

Many of these additives may have adverse effects on particular properties such as smoke point or clarity and pourability of fluid shortenings. It is to be understood that a balancing of factors may be indicated.

Although the general class of emulsifiers has been hereinbefore described, specific examples include: propylene glycol monostearate; 1,3-propanediol monostearate; 1,4-butanediol monostearate; 1,3-butanediol monostearate; 1,5-pentanediol monostearate; and the corresponding monoesters of the preceding named diols with palmitic acid, arachidic acid, and behenic acid.

The diol monoesters employed in this invention can be prepared by direct esterification or interesterification of the diol by reaction with the desired fatty acid or a fatty ester of a monohydric or polyhydric alcohol under appropriate conditions of temperature, either with or without catalyst and/or solvent. In the direct reactions between fatty acid and diol, the reactants are normally mixed in ratios of 1 mole of fatty acid to .75 or more moles of diol. The yield of monoester is enhanced by using solvents such as dimethylformamide, dimethylacetamide, dimethyl sulfoxide, xylene, or toluene; and catalysts such as p-toluene sulfonic acid, sulfuric acid, hydrogen chloride, or zinc chloride and other acidic or salt types are particularly effective in accelerating the rate of esterification.

Interesterification of the diol with fatty esters of alcohols such as methanol, ethanol, and propanol as well as fatty esters of polyhydric alcohols such as glycol, propylene glycol, 1,3-propanediol, 1,4-butanediol, glycerol, erythritol, ribitol sorbitol, mannitol, and others is a particularly good path to the diol monoesters. Mutual solvents are of good value including such solvents as dimethylformamide, dimethylacetamide, dimethyl sulfoxide, dioxane, pyridine, xylene, and toluene. Catalysts of greatest value are such catalysts as sodium methoxide, benzyl trimethyl ammonium methoxide, sodium hydroxide and others described in U.S. Patent 2,442,532, Eckey, at column 24, line 18 et seq.

The reaction products containing diol monoester are recovered by inactivation of the catalyst with an appropriate acid or base such as acetic or phosphoric acid and potassium or sodium carbonate. The reaction products can be freed of solvents by distillation and used as prepared or they can be purified by water washing and crystallization techniques to further enrich the diol monoester content. Crystallization from an aliphatic hydrocarbon solvent such as hexane is particularly effective in enriching the monoesters in the crystalline phase. Solvent partition methods are also highly effective in concentrating the diol monoesters.

The preceding methods have been given as examples only and are not intended to limit the scope of the invention to a particular method of preparation.

The second part of the cake baking process involves the actual baking. A major problem in this stage is the retention of gas in the cake in the form of small bubbles until the cake is baked. A second problem is the minimization of shrinkage during and subsequent to baking the bake. These problems can be overcome by the use of one or more high temperature batter stabilizers. Without both emulsifier and high temperature batter stabilizer the complete baking process cannot be accomplished with single-stage mixing of the batter ingredients.

Four general classes of high temperature batter stabilizers have been heretofore described. Specific materials in these classes include: myristic acid; palmitic acid; stearic acid; arachidic acid; behenic acid; mixtures of the preceding named fatty acids whether derived from animal, vegetable or marine sources; the condensation product of either malic, tartaric, citric, citramalic, trihydroxy glutaric, mucic, saccharic, or mannosaccharic acid with any of the preceding named fatty acids; the condensation product of either malic, tartaric, citric, citramalic, trihydroxy glutaric, mucic, saccharic, mannosaccharic, malonic, succinnic, glutaric, methyl succinnic, dimethyl succinnic, adipic, tricarballylic, maleic, fumaric, itaconic, mesaconic, citraconic or aconitic acid with either (a) a monoglyceride, a diglyceride or a mixture of mono- and diglycerides containing fatty acid radicals of the preceding named fatty acids, and, if desired, unsaturated, straight chain, fatty acid radicals having from 14 to 22 carbon atoms in sufficient quantities to raise the Iodine Value of the condensation product not higher than about 60, or (b) a monoester of either propylene glycol, 1,3-propanediol, 1,4-butanediol, 1,3-butanediol, or 1,5-pentanediol with any of the preceding named fatty acids; and the condensation product of either succinic, methyl succinic, dimethyl succinic, glutaric, malonic, adipic, maleic, or fumaric acids with saturated straight chain fatty alcohols containing from 14 to 22 carbon atoms, in which all of the preceding condensation products are characterized by having at least one free carboxyl group per molecule.

Mixtures of these and other compounds within the scope of the claims can also be used. Examples of mixtures include mixtures of stearic acid and malic palmitate; stearic acid and a condensation product of citric acid and a monoglyceride containing a fatty acid radical of from 14 to 22 carbon atoms; malic palmitate and a condensation product of citric acid and a monoglyceride containing a fatty acid radical of from 14 to 22 carbon atoms, and malic stearate and tartaric distearate.

This condensation product of citric acid and a monoglyceride containing a fatty acid radical of from 14 to 22 carbon atoms, hereinafter will be referred to as citric acid monoglyceride. The term "monoglyceride" is intended to include materials containing as little as one half monoglyceride with the rest being primarily diglyceride and only a trace of triglyceride. The citric acid monoglycerides can contain mixtures of fatty acid radicals and can be derived from naturally occuring glyceridic materials.

It has been noticed that citric acid monoglyceride may cause shrinkage of the completed baked cake at high levels, but when used in lesser amounts, it is effective. However, since citric acid monoglyceride is effective in producing a finer grain, it is very useful as a component of a mixture of high temperature stabilizers.

The stabilizers hereinbefore described can be prepared as follows:

(1) The fatty acids which function as high temperature batter stabilizers can be readily obtained from hydrogenated glycerides by saponification, acidulation, and isolation procedures. The fatty acid desired determines the choice of glyceridic material. For example, hydrogenated soybean oil would yield a concentrate of stearic acid and hydrogenated rapeseed oil would yield a concentrate of behenic acid.

(2) The second group of high temperature batter stabilizers can be prepared by esterifying polycarboxylic or polycarboxylic hydroxy acids with mono- and diglycerides, and/or monofatty acid esters of diols by direct esterification. This reaction is advantageously carried out in a mutual solvent such as dimethylformamide, dimethylacetamide, dioxane, xylene, and toluene either with or without the use of a catalyst such as sulfuric acid, p-toluene sulfonic acid, hydrogen chloride, zinc chloride, and other such catalysts. The preparations are best carried out with reaction temperatures in the range of from about 75° C. to about 175° C. with water being removed by evolution under reduced pressure or by azeotropic distillation. The stabilizers are isolated by appropriate distillation, and/or washing, and/or crystallization treatments when required to remove solvents, excess reactants, and impurities. It is essential to the functioning of these stabilizers that the reaction products contain a substantial number of molecules containing one or more unesterified carboxyl groups.

The polycarboxylic acids employed in the above reactions can be used in the form of their anhydrides or acid chlorides, when these are available. The reaction conditions necessary for using the anhydrides or acid chlorides will hereinafter be described more fully in connection with the third group of stabilizers.

(3) The third group of high temperature batter stabilizers can be prepared by acylating the polycarboxylic hydroxy acids with fatty acid chlorides by reaction in appropriate solvents such as pyridine, quinoline, dioxane, dimethylformamide, dimethylacetamide, and mixtures thereof, either with or without addition of lipid solvents such as chloroform, benzene, and ethyl ether. These reactions, and the reactions hereinbefore mentioned in connection with the second group of high temperature batter stabilizers, can be carried out over a wide temperature range of from about 0° C. to about 150° C. or higher as long as undesirable side reactions are avoided. Upon completion of the acylation reaction, the stabilizers are isolated by dilution with an aqueous phase followed by washing, and/or distillation, and/or crystallization when required to remove solvents, excess reactants, and impurities. The method of U.S. Patent 2,251,695, Tucker, is an effective example of such a procedure.

(4) The fourth group of high temperature stabilizers can be prepared by the same procedures used to prepare the second group, using the appropriate fatty acohols.

Again, although specific examples of methods of preparation have been given, this is not intended to limit the scope of this invention to a particular method of preparation.

Combinations of high temperature batter stabilizers may give better results than a single high temperature batter stabilizer. For example, with respect to volume of cake, a mixture of citric acid monoglyceride with stearic acid exhibited a maximum near a ratio of 0.75 citric acid monoglyceride to 1.25 stearic acid when the total percent of high temperature batter stabilizer was 2% in cottonseed oil. With respect to volume, malic palmitate gave best results when used alone, but the grain was much better when used in combination with small amounts of stearic acid and the volume was still very good. Malic palmitate/citric acid monoglyceride mixtures gave a maximum volume at a ratio of about 1.85 to 0.15 at a total level of 2%. Other mixtures can also be used.

It will be understood that some combinations of emulsifiers and high temperature stabilizers are particularly desirable with respect to such considerations as cake volume, grain, taste, smoke point, cost and availability. Combinations that have been found to be good include, for example: propylene glycol monostearate with stearic acid in ratios of emulsifier to stabilizer of 85/15, 70/20, and 55/45; propylene glycol monostearate with behenic acid in ratios of 85/15; a mixture of propylene glycol monostearate and propylene plycol monobehenate with behenic acid; propylene glycol monostearate with malic stearate; propylene glycol monostearate with mixtures of either citric acid monoglyceride and stearic acid, malic palmitate and stearic acid, or malic palmitate and citric acid monoglyceride; 1,3-propanediol monostearate with stearic acid; a mixture of propylene glycol monostearate and propylene glycol distearate with either malic stearate or stearic acid; and a mixture of propylene glycol monostearate with either octadecyl hydrogen succinate, tartaric distearate, or a mixture of malic stearate and tartaric distearate.

When the additives of this invention are used in a shortening, the presence of other additives such as conventional monoglyceride emulsifiers is not precluded, since conventional benefits may still be derived by their use. It will be recognized, of course, that the presence of other additives can have an effect on the operation of the additives of this invention and therefore, the desirability of their use will depend upon the results desired.

Any fatty triglyceride material is suitable for use in shortenings of this invention so long as it has a liquid phase and has no qualities which would make it harmful to the health or esthetically undesirable. As far as physical properties are concerned, the material can be entirely liquid at room temperature like salad oils, or the material can be a suspension of solids in a liquid such as is described in U.S. Patents 2,521,219, and 2,521,242, issued September 5, 1950, and U.S. Patents 2,815,285 and 2,815,286, issued December 3, 1957. The material can also contain sufficient solids so that a plastic shortening is formed in which the liquid phase is trapped within a matrix of fat crystals in such a manner that no liquid phase is evident.

The chemical constituents of the fatty triglycerides can also vary widely. For example, the triglycerides can be of animal, vegetable, or marine origin. If desired, the triglycerides can be unhydrogenated or they can be hydrogenated to some degree to improve their keeping properties or other properties desirable for a shortening. Other examples of permissible variations include mixing different fatty triglycerides or interesterifying mixtures of fatty triglycerides to give a random distribution of the triglycerides. Low temperature interesterification can be used to form a maximum amount of trisaturates and triunsaturates. An example of a suitable mixture is the addition of a high-melting triglyceride to an oil to form either a plastic shortening or a suspension. Although specific types of triglycerides have been mentioned, this should not be taken as limiting this invention to any specific fatty triglyceride materials.

All types of layer cakes can be made with the products of this invention. White cakes, yellow cakes, chocolate cakes, and many others can be prepared by simply mixing the shortenings of this invention with the other ingredients of the cake in a single mixing step. Therefore, simplification is not at the expense of variety. One of the unique advantages of this invention is that regardless of the ingredients or the detailed instructions for mixing which a recipe contains, substituting the shortenings of this invention for prior art shortenings enables one to combine the ingredients of the recipe in a single mixing step. Simply adding all of the ingredients to a mixing bowl and then mixing is all that is required. Although specific types of cakes have been mentioned, this should in no way be held to limit this invention to the preparation of any specific cake.

The shortenings of this invention also tend to equalize the variations in baking performance which are usually obtained with various kinds of cake flour, thus permitting the use of a wider range of flours than has been heretofore possible with prior art baking shortenings.

The following examples are illustrative of the practice of the instant invention and show the superior results that can be obtained with the instant invention.

In the following tables batter densities and volumes have been given. In general, a cake made with cottonseed oil and no additives will give a batter density of approximately 1.15 g./cc., and a volume of 925–950 cc. per 400 g. of batter. Similarly a cake made with a conventional plastic shortening, which does not have conventional emulsifiers or the present additives, would give a batter density of about 0.95 g./cc. and a cake volume of about 1040 cc. per 400 g. of batter. The plastic shortening would also give a coarse grain. A decrease in batter density of from about 0.1 to 0.2 g./cc. and an increase in cake volume of about 100 cc. are considered significant improvements. The lower the batter density that is achieved with adequate stabilization, the better the results.

When propylene glycol monostearate is mentioned in these examples, unless otherwise stated, it refers to a commercial grade reaction product which consists of approximately one half monoester and approximately one half diester. The term "citric acid monoglyceride" as used in the following examples refers to the condensation product of citric acid with a "monoglyceride" containing fatty acids having from 14 to 22 carbon atoms. Unless otherwise described, the specific material used was a commercial product "Seqol 130." The fatty acids present in this product are 2.1% myristic, 50.3% palmitic, 44.4% stearic and 3.3% palmitoleic based upon an analysis of the product. "Seqol 140," also described by its manufacturer as stearyl monoglyceridyl citrate, will be listed by its trade name. It is reported to be a condensation product similar to "Seqol 130" except that the acids comprise about 28% stearic, 25% oleic, and 47% linoleic, which gives the finished product an Iodine Value of about 43.7. Although the products are referred to as citric acid monoglycerides, they actually are the reaction product of citric acid and a mixture of partial glycerides containing as much as half diglycerides.

In all of the examples, the additives were dissolved in the fatty triglyceride material serving as the shortening base, although this should not be taken as limiting the invention in any way.

All percentages given herein are as percent by weight of the total shortening including additives.

The following basic cake recipe was used in obtaining the data contained in Tables I through VI.

|  | G. |
|---|---|
| Flour | 95.0 |
| Shortening | 50.0 |
| Granulated sugar | 133.0 |
| Salt | 1.5 |
| Milk | 120.0 |
| Double-acting baking powder | 5.78 |
| Fresh egg whites | 60.0 |
| Vanilla extract | 2.5 |

The ingredients were mixed for four minutes at 450 revolutions per minute (medium speed) in a conventional household mixer. The batter density was then measured in grams per cubic centimeter. Next, 400 g. of batter was placed in a pan and baked for 25 minutes at 365° F. The baked cakes were removed from the oven and fifteen minutes later, their volume was measured in cubic centiimeters.

In Tables I through VI, the statement that refined and bleached cottonseed oil was used as a shortening refers to the use of said cottonseed oil as the fatty triglyceride base oil for the shortening.

TABLE I

[Refined and bleached cottonseed oil was used as a shortening and stearic acid was used as a high temperature batter stabilizer]

| Example No. | Emulsifier | Percent emulsifier | Percent stearic acid | Batter density, g./cc. | Cake volume, cc. | Remarks |
|---|---|---|---|---|---|---|
| 1 |  |  |  | 1.10 | 925 | Coarse grain, unstable batter. |
| 2 |  |  | 2 | 1.15 | 1,020 | Do. |
| 3 | Propylene glycol monostearate (98% pure). | 4 |  | 1.05 | 935 | Typical oil cake. |
| 4 | ___do___ | 4 | 2 | 0.79 | 1,260 | Fine grained. |
| 5 | ___do___ | 8 | 2 | 0.71 | 1,215 | Slight dip in cake contour. |
| 6 | ___do___ | 12 | 2 | 0.62 | 1,330 | Fine grained, slightly rounded contour. |
| 7 | 1,3-propanediol monostearate. | 2 | 2 | 0.85 | 1,210 |  |
| 8 | ___do___ | 4 | 2 | 0.79 | 1,225 |  |
| 9 | ___do___ | 8 | 2 | 0.63 | 1,300 |  |
| 10 | ___do___ | 12 | 2 | 0.79 | 1,300 |  |
| 11 | ___do___ | 16 | 2 | 0.66 | 1,355 |  |
| 12 | 1,4-butanediol monostearate. | 2 | 2 | 1.10 | 985 |  |
| 13 | ___do___ | 4 | 2 | 0.83 | 1,150 | Stable batter. |
| 14 | ___do___ | 8 | 2 | 0.68 | 1,300 | Do. |
| 15 | ___do___ | 12 | 2 | 0.67 | 1,260 | Do. |
| 16 | ___do___ | 16 | 2 | 0.83 | 1,005 | Starch fallout, unstable batter. |
| 17 | 1,5-pentanediol monostearate. | 2 | 2 | 1.12 | 925 | Unstable batter during baking. |
| 18 | ___do___ | 4 | 2 | 0.82 | 1,150 |  |
| 19 | ___do___ | 5 | 2 | 0.74 | 1,130 |  |
| 20 | ___do___ | 6 | 2 | 0.80 | 1,185 |  |
| 21 | ___do___ | 8 | 2 | 1.09 | 910 | Unstable batter. |
| 22 | ___do___ | 12 | 2 | 1.14 | 900 | Dip in center of cake. |
| 23 | 1,6-hexanediol monostearate. | 4 | 2 | 1.05 | 910 | Unstable batter during baking. |
| 24 | ___do___ | 6 | 2 | 1.03 | 930 | Slightly unstable. |
| 25 | ___do___ | 8 | 2 | 1.11 | 930 | Do. |
| 26 | ___do___ | 10 | 2 | 1.14 | 920 | Do. |
| 27 | Propylene glycol monobehenate. | 1.5 | 2 | 1.04 | 1,095 | Slightly unstable in baking. |
| 28 | ___do___ | 2.0 | 2 | 0.88 | 1,115 | Stable batter during baking, fine grained. |
| 29 | ___do___ | 4.0 | 2 | 0.91 | 1,080 | Stable batter, fine grained. |
| 30 | ___do___ | 6.0 | 2 | 0.91 | 1,080 | Do. |
| 31 | ___do___ | 8.0 | 2 | 0.82 | 1,130 | Do. |

TABLE II

[Refined and bleached cottonseed oil was used as a shortening to which varying amounts of indicated emulsifier and high temperature batter stabilizer were added]

| Example No. | Emulsifier | Percent Emulsifier | High temperature stabilizer | Percent high temperature batter stabilizer | Batter density, g./cc. | Cake volume, cc. | Remarks |
|---|---|---|---|---|---|---|---|
| 32 | Propylene glycol monostearate. | 2.0 | Malic palmitate | 2.0 | 1.14 | 1,155 | |
| 33 | ---do--- | 4.0 | ---do--- | 2.0 | 1.04 | 1,170 | |
| 34 | ---do--- | 8.0 | ---do--- | 2.0 | 0.75 | 1,130 | |
| 35 | ---do--- | 12.0 | ---do--- | 2.0 | 0.67 | 1,440 | |
| 36 | ---do--- | 14.0 | ---do--- | | 0.76 | 985 | |
| 37 | ---do--- | 14.0 | Citric acid monoglyceride. | 1.0 | 0.70 | 1,225 | |
| 38 | ---do--- | 14.0 | ---do--- | 2.0 | 0.66 | 950 | Shrank on cooling. |
| 39 | ---do--- | 4.0 | Stearic acid | 2.0 | 1.17 | 955 | |
| 40 | ---do--- | 8.0 | ---do--- | 2.0 | 1.08 | 1,045 | |
| 41 | ---do--- | 12.0 | ---do--- | 2.0 | 0.86 | 1,180 | |
| 42 | ---do--- | 16.0 | ---do--- | 2.0 | 0.66 | 1,345 | |
| 43 | Propylene glycol monostearate (98% pure). | 3.4 | ---do--- | 0.6 | 0.94 | 1,005 | |
| 44 | ---do--- | 4.25 | ---do--- | 0.75 | 0.72 | 1,495 | |
| 45 | ---do--- | 5.1 | ---do--- | 0.9 | 0.76 | 1,350 | |
| 46 | ---do--- | 6.8 | ---do--- | 1.2 | 0.72 | 1,090 | |
| 47 | ---do--- | 2.55 | Behenic acid | 0.45 | 0.81 | 1,225 | |
| 48 | ---do--- | 3.4 | ---do--- | 0.6 | 0.81 | 1,280 | |
| 49 | ---do--- | 5.1 | ---do--- | 0.9 | 0.77 | 1,130 | |
| 50 | ---do--- | 6.8 | ---do--- | 1.2 | 0.71 | 1,315 | |
| 51 | Propylene glycol monostearate. | 14.0 | Malic stearate | 0.1 | 0.65 | 1,005 | |
| 52 | ---do--- | 14.0 | ---do--- | 0.25 | 0.65 | 1,075 | |
| 53 | ---do--- | 14.0 | ---do--- | 0.5 | 0.68 | 1,585 | Coarse grain. |
| 54 | ---do--- | 14.0 | ---do--- | 1.0 | 0.68 | 1,615 | Do. |
| 55 | ---do--- | 14.0 | ---do--- | 2.0 | 0.72 | 1,635 | Do. |
| 56 | ---do--- | 14.0 | Tartaric distearate. | 0.5 | 0.66 | 1,280 | |
| 57 | ---do--- | 14.0 | ---do--- | 1.0 | 0.65 | 1,315 | |
| 58 | ---do--- | 14.0 | ---do--- | 2.0 | 0.70 | 1,330 | |
| 59 | ---do--- | 14 | | | 0.70 | 970 | |
| 60 | ---do--- | 14 | Acetic acid | 2.0 | 0.72 | 900 | Unstable batter. |
| 61 | ---do--- | 14 | Butyric acid | 2.0 | 0.79 | 780 | Do. |
| 62 | ---do--- | 14 | Lauric acid | 2.0 | 1.05 | 1,010 | |
| 63 | ---do--- | 14 | Myristic acid | 2.0 | 0.97 | 1,060 | |
| 64 | ---do--- | 14 | Palmitic acid | 2.0 | 0.76 | 1,265 | |
| 65 | ---do--- | 14 | Stearic acid | 2.0 | 0.72 | 1,305 | |
| 66 | ---do--- | 14 | Arachidic acid | 2.0 | 0.88 | 1,120 | |
| 67 | ---do--- | 14 | Behenic acid | 2.0 | 0.73 | 1,215 | |

TABLE III

[Refined and bleached cottonseed oil was used as a shortening together with varying amounts of the indicated additives]

| Example No. | Percent propylene glycol monostearate (98% pure) | Percent propylene glycol monobehenate | High temperature batter stabilizer | Percent high temperature batter stabilizer | Batter density, g./cc. | Cake volume, cc. | Remarks |
|---|---|---|---|---|---|---|---|
| 68 | 6.0 | | Stearic acid | 2 | 0.77 | 1,130 | |
| 69 | 4.5 | 1.5 | ---do--- | 2 | 0.83 | 1,205 | |
| 70 | 3.0 | 3.0 | ---do--- | 2 | 0.90 | 1,040 | |
| 71 | 1.5 | 4.5 | ---do--- | 2 | 0.84 | 1,185 | |
| 72 | | 6.0 | ---do--- | 2 | 0.91 | 1,085 | |
| 73 | 6.0 | | Behenic acid | 2 | 0.75 | 1,350 | |
| 74 | 4.5 | 1.5 | ---do--- | 2 | 0.83 | 1,350 | |
| 75 | 3.0 | 3.0 | ---do--- | 2 | 0.84 | 1,260 | |
| 76 | 1.5 | 4.5 | ---do--- | 2 | 0.93 | 1,260 | |
| 77 | | 6.0 | ---do--- | 2 | 0.87 | 1,345 | |
| 78 | | 3.0 | 1:1 mixture of monostearoyl propylene glycol hydrogen succinate and stearic acid. | 1 | 0.64 | 1,760 | Center cracked. |

TABLE IV

[Refined and bleached cottonseed oil was used as a shortening and 14% propylene glycol monostearate was added as an emulsifier together with varying amounts of the indicated high temperature batter stabilizers]

| Example No. | High temperature batter stabilizers | | | | Batter density, g./cc. | Cake volume, cc. | Remarks |
|---|---|---|---|---|---|---|---|
| | No. 1 | Percent No. 1 | No. 2 | Percent No. 2 | | | |
| 79 | Citric acid monoglyceride. | 2.0 | Stearic acid | | 0.64 | 965 | Shrank. |
| 80 | ----do---- | 1.0 | ----do---- | 1.0 | 0.73 | 1,185 | |
| 81 | ----do---- | 0.75 | ----do---- | 1.25 | 0.72 | 1,225 | |
| 82 | ----do---- | 0.50 | ----do---- | 1.50 | 0.7 | 1,185 | |
| 83 | ----do---- | 0.25 | ----do---- | 1.75 | 0.71 | 1,060 | |
| 84 | Malic palmitate | 2.00 | ----do---- | | 0.67 | 1,550 | Coarse grain. |
| 85 | ----do---- | 1.75 | ----do---- | 0.25 | 0.68 | 1,510 | Do. |
| 86 | ----do---- | 1.50 | ----do---- | 0.50 | 0.68 | 1,350 | Medium grain. |
| 87 | ----do---- | 1.25 | ----do---- | 0.75 | 0.70 | 1,360 | Do. |
| 88 | ----do---- | 1.00 | ----do---- | 1.0 | 0.70 | 1,170 | Fine grain. |
| 89 | ----do---- | 0.5 | ----do---- | 1.5 | 0.73 | 1,020 | |
| 90 | ----do---- | | ----do---- | 2.0 | 0.69 | 1,140 | |
| 91 | ----do---- | 2.0 | Citric acid monoglyceride. | | 0.67 | 1,550 | Coarse grain. |
| 92 | ----do---- | 1.9 | ----do---- | 0.1 | 0.67 | 1,620 | Do. |
| 93 | ----do---- | 1.85 | ----do---- | 0.15 | 0.67 | 1,675 | Do. |
| 94 | ----do---- | 1.8 | ----do---- | 0.2 | 0.67 | 1,620 | Do. |
| 95 | ----do---- | 1.75 | ----do---- | 0.25 | 0.63 | 1,465 | Medium grain. |
| 96 | ----do---- | 1.0 | ----do---- | 1.0 | 0.66 | 1,350 | Fine grain. |
| 97 | ----do---- | 0.5 | ----do---- | 1.5 | 0.66 | 1,170 | Very fine grain. |
| 98 | ----do---- | 0.0 | ----do---- | 2.0 | 0.64 | 965 | Shrank. |
| 99 | Tartaric distearate. | 0.5 | | | 0.66 | 1,280 | Shrank in oven. |
| 100 | ----do---- | 1.0 | | | 0.65 | 1,315 | Do. |
| 101 | ----do---- | 2.0 | | | 0.70 | 1,330 | Do. |
| 102 | ----do---- | 0.75 | Malic stearate | 0.25 | 0.72 | 1,205 | |
| 103 | ----do---- | 0.50 | ----do---- | 0.50 | 0.69 | 1,105 | |
| 104 | ----do---- | 0.34 | ----do---- | 0.66 | 0.77 | 1,045 | |
| 105 | ----do---- | 0.25 | ----do---- | 0.75 | 0.77 | 1,315 | |
| 106 | ----do---- | 0.625 | ----do---- | 0.025 | 0.69 | 1,300 | Fine grain, tender. |
| 107 | ----do---- | 1.00 | ----do---- | 0.5 | 0.72 | 3,355 | Very fine grain, crust cracked. |
| 108 | Octadecyl hydrogen succinate. | 0.25 | | | 0.65 | 1,005 | |
| 109 | ----do---- | 0.50 | | | 0.65 | 1,620 | Crust cracked open. |
| 110 | ----do---- | 1.00 | | | 0.66 | 1,685 | Do. |
| 111 | ----do---- | 2.00 | | | 0.63 | 1,025 | |
| 112 | Monostearoyl propylene glycol hydrogen succinate. | 0.25 | | | 0.67 | 1,005 | Unstable. |
| 113 | ----do---- | 0.30 | | | 0.63 | 910 | Dipped in center. |
| 114 | ----do---- | 0.40 | | | 0.61 | 1,100 | Do. |
| 115 | ----do---- | 0.50 | | | 0.61 | 1,385 | |
| 116 | ----do---- | 0.60 | | | 0.60 | 1,385 | |
| 117 | ----do---- | 0.75 | | | 0.61 | 1,370 | Slight dip in center. |
| 118 | ----do---- | 1.00 | | | 0.60 | 1,150 | Slightly dipped. |
| 119 | ----do---- | 2.00 | | | 0.59 | 1,025 | Dipped. |
| 120 | Seqol 140 | 0.25 | | | 0.64 | 965 | |
| 121 | ----do---- | 0.50 | | | 0.64 | 1,180 | |
| 122 | ----do---- | 1.00 | | | 0.66 | 1,210 | Shrank on cooling. |
| 123 | ----do---- | 2.00 | | | 0.68 | 1,185 | Shrank in oven and on cooling. |

TABLE V

[Refined and bleached cottonseed oil was used as a shortening together with 6% by weight of an 80/20 mixture of propylene glycol monostearate (98% pure) and propylene glycol distearate as an emulsifier and varying amounts of the indicated high temperature batter stabilizers]

| Example No. | High temperature batter stabilizer | Percent high temperature batter stabilizer | Batter density, g./cc. | Cake volume, cc. | Remarks |
|---|---|---|---|---|---|
| 124 | Stearic acid | 0.5 | 0.63 | 1,315 | Coarse. |
| 125 | ----do---- | 1.0 | 0.65 | 1,760 | Very fine grain. |
| 126 | ----do---- | 2.0 | 0.72 | 1,315 | Fine grain. |
| 127 | Malic stearate | 0.5 | 0.65 | 1,620 | Medium grain. |
| 128 | ----do---- | 1.0 | 0.71 | 1,705 | Do. |
| 129 | ----do---- | 2.0 | 0.85 | 1,115 | Do. |
| 130 | Citric acid monoglyceride. | 0.5 | 0.96 | 1,185 | |
| 131 | ----do---- | 1.0 | 0.86 | 1,115 | |
| 132 | ----do---- | 2.0 | 0.75 | 1,005 | Shrank. |

TABLE VI

[Refined and bleached cottonseed oil was used as a shortening and a mixture of 4.8% propylene glycol monostearate and 1.2% propylene glycol distearate was added together with varying amounts of the indicated high temperature batter stabilizers]

| Example No. | High temperature batter stabilizer | Percent high temperature batter stabilizer | Batter density, g./cc. | Cake volume, cc. | Remarks |
|---|---|---|---|---|---|
| 133 | Malic stearate | 0.5 | .65 | 1,620 | |
| 134 | ----do---- | 1.0 | .71 | 1,705 | |
| 135 | ----do---- | 2.0 | .85 | 1,150 | |
| 136 | Citric acid monoglyceride. | 0.5 | .96 | 1,185 | Shrank. |
| 137 | ----do---- | 1.0 | .86 | 1,115 | Do. |
| 138 | Stearic acid | 0.5 | .63 | 1,315 | Do. |
| 139 | ----do---- | 1.0 | .63 | 1,760 | |
| 140 | ----do---- | 2.0 | .72 | 1,315 | |

The following examples show the desirability of completely dissolving the emulsifier system in the liquid phase of the shortening. A mixture of pure propylene glycol monostearate and stearic acid in the ratio of 85/15 was added to a commercial plastic shortening without other emulsifiers being present.

*Example 141*

This shortening was plasticized and used immediately after warming for about two to three hours to room temperature. The cake batter had a density of 1.02 gm./cc. and the cake had a volume of 1025 cc.

*Example 142*

This shortening was plasticized and stored at 80° F. for 18 hours before use. The cake batter had a density of 0.92 and the cake had a volume of 960 cc.

*Example 143*

This shortening was heated to dissolve all solids and then allowed to stand at 80° F. for 18 hours before use. The cake batter had a density of 0.72 and the cake had a volume of 1585 cc.

As can be seen from the three preceding examples, air incorporation was helped by processing steps which increase the amount of additives in solution in the liquid phase of the shortening.

The following recipe was used in obtaining the data for the following table.

| Ingredient: | Percent by weight |
| --- | --- |
| Cake flour | 24.0 |
| Non-fat milk solids | 1.2 |
| Salt | 0.5 |
| Soda | 0.5 |
| Monocalcium phosphate | 0.4 |
| Sodium acid pyrophosphate | 0.2 |
| A commercial plastic shortening containing the indicated additives | 7.1 |
| Sugar (industrial fine) | 25.1 |
| Water | 30.5 |
| Whole egg | 10.5 |
| | 100.0 |

The cake was mixed for three minutes at 450 revolutions per minute and 400 g. of batter was placed in a pan. The cake was then baked at 350° F. for about 25 to 27 minutes. The cakes were removed from the oven and fifteen minutes later the volume of the cake was measured in cubic centimeters.

The fatty triglyceride material serving as a base for the shortening was a mixture of about 10% by weight of a mixture of lard and tallow hydrogenated to give a solids content of 19.5% at 70° F. and directedly rearranged, about 5% by weight hydrogenated cottonseed oil with an Iodine Value of 8, and about 85% by weight of a mixture of refined and bleached cottonseed oil and soybean oil in a ratio of 15/85 hydrogenated to an Iodine Value of about 70. This shortening was melted to dissolve the additives and then chilled with beating and held at room temperature for about 18 hours.

TABLE VII

| Example No. | Percent propylene glycol monostearate | Percent Stearic acid | Batter density (g./c.c.) | Cake volume, c.c. | Remarks |
| --- | --- | --- | --- | --- | --- |
| 144 | 0.0 | 0.0 | 0.99 | 1,100 | Unstable batter. |
| 145 | 0.0 | 2.0 | 0.96 | 1,105 | |
| 146 | 5.25 | 0.75 | 0.89 | 1,150 | |
| 147 | 7.90 | 1.10 | 0.82 | 1,280 | |
| 148 | 10.50 | 1.50 | 0.77 | 1,335 | |
| 149 | 14.00 | 2.00 | 0.74 | 1,315 | |

Although the data in the preceding tables indicate the performance of shortenings of this invention in white and yellow cakes, similar good results can be achieved in other types of cakes such as chocolate and spice, by the use of appropriate formulations well-known to those skilled in the art. Likewise the incorporation of the additives in oils which contain higher melting glyceride materials so as to form pourable suspensions or plastic shortenings will also result in improved performance.

In addition to the use of refined and bleached cottonseed oil and a mixture of hydrogenated lard, tallow, cottonseed oil and soybean oil as a base oil for the shortenings of this invention; other fatty triglyceride materials having a liquid oily phase such as peanut oil, linseed oil, sunflower seed oil, corn oil, olive oil, rapeseed oil, fish oil and the like or normally liquid fractions obtained from triglyceride oils can be substituted with equivalent results.

The preceding examples are illustrative of the invention and are not to be taken as in any way limiting the scope of this invention.

However, as can be seen from the examples, the presence of either emulsifier or high temperature batter stabilizer alone is insufficient to enable one to prepare satisfactory cakes by single-stage mixing. A combination of the two, however, generally within the previously stated limits, gives exceptional results.

What is claimed is:

1. A glyceride shortening composition which can be used in the preparation of recipe cake batters with single-stage mixing containing as additives from about 1.5% to about 12%, by weight, of monoester of straight chain aliphatic diol with saturated fatty acid, said diol containing from 3 to 5 carbon atoms and said saturated fatty acid containing from 16 to 22 carbon atoms, and from about 0.25% to about 4%, by weight, of material selected from the group consisting of (1) saturated fatty acids containing from 14 to 22 carbon atoms; (2) the condensation product of material selected from the group consisting of (a) a partial fatty acid glyceride, containing an average of from one to two fatty acid radicals having from 14 to 22 carbon atoms, but not more than enough unsaturated fatty acid radicals to give a condensation product having an Iodine Value of 60 and (b) a monoester of a straight chain aliphatic diol with a saturated fatty acid, said diol containing from three to five carbon atoms and said saturated fatty acid containing from 14 to 22 carbon atoms with a polycarboxylic acid having from zero to four hydroxy groups, said polycarboxylic acid containing three to six carbon atoms and said condensation product having at least one free carboxyl group per molecule; (3) the condensation product of saturated fatty acid containing from 14 to 22 carbon atoms with a polycarboxylic acid having from one to four hydroxy groups, said polycarboxylic acid containing from three to six carbon atoms and said condensation product having at least one free carboxyl group per molecule; (4) the condensation product of a saturated straight chain fatty alcohol containing from 14 to 22 carbon atoms with a dicarboxylic acid having no hydroxy groups and containing from 3 to 6 carbon atoms, said condensation product having at least one free carboxyl group per molecule; and (5) mixtures of the preceding materials.

2. The composition of claim 1 containing as an additional additive from 0.25% to the percent where the liquid phase of the shortening is saturated, of material selected from the group consisting of propylene glycol distearate and tristearin.

3. The composition of claim 1 in which the glyceride shortening composition comprises a suspension of solid glycerides in liquid glycerides.

4. The composition of claim 1 in which the additives are propylene glycol monostearate and stearic acid.

5. The process of preparing a shortening which can be used in the preparation of recipe cake batters with single-stage mixing which comprises dissolving in the liquid phase of a glyceride shortening composition as additives from about 1.5% to about 8% by weight of monoester of straight chain aliphatic diol with saturated fatty acid, said diol containing from 3 to 5 carbon atoms and said saturated fatty acid containing from 16 to 22 carbon atoms, and from about 0.25% to about 4% by weight of material selected from the group consisting of (1) saturated fatty acids containing from 14 to 22 carbon atoms; (2) the condensation product of material selected from the group consisting of (a) a partial fatty acid glyceride, containing an average of from one to two fatty acid radicals having from 14 to 22 carbon atoms but not more than enough unsaturated fatty acid radicals to give a condensation product having an Iodine Value of 60, and (b) a monoester of a straight chain aliphatic diol with a saturated fatty acid, said diol containing from three to five carbon atoms and said saturated fatty acid containing from 14 to 22 carbon atoms with a polycarboxylic acid having from zero to four hydroxy groups, said acid containing from three to six carbon atoms and said condensation product having at least one free carboxyl group per molecule; (3) the condensation product of a saturated fatty acid containing from 14 to 22 carbon atoms with a polycarboxylic acid having from one to four hydroxy groups, said polycarboxylic acid containing from three to six carbon atoms and said condensation product having at least one free carboxyl group per molecule; (4) the condensation product of a saturated straight chain fatty alcohol containing from 14 to 22 carbon atoms with a dicarboxylic acid having no hydroxy groups and containing from 3 to 6 carbon atoms, said condensation product having at least one free carboxyl group per molecule; and (5) mixtures of the preceding materials.

6. The process according to claim 5 in which the additives are propylene glycol monostearate and stearic acid.

7. The process according to claim 5 in which there is additionally incorporated from 0.25% to the percent where the liquid phase of the shortening is saturated, of a material selected from the group consisting of propylene glycol distearate and tristearin.

8. A glyceride shortening composition which can be used in the preparation of recipe cake batters with single-stage mixing containing as additives from about 1.5% to about 12%, by weight, of propylene glycol monostearate and from about 0.25% to about 4%, by weight, of behenic acid.

9. A glyceride shortening composition which can be used in the preparation of recipe cake batters with single-stage mixing containing as additives from about 1.5% to about 12%, by weight, of a mixture of propylene glycol monostearate and propylene glycol monobehenate and from about 0.25% to about 4%, by weight, of behenic acid.

10. A glyceride shortening composition which can be used in the preparation of recipe cake batters with single-stage mixing containing as additives from about 1.5% to about 12%, by weight, of 1,3-propanediol monostearate and from about 0.25% to about 4%, by weight, of stearic acid.

11. A glyceride shortening composition which can be used in the preparation of recipe cake batters with single-stage mixing containing as additives from about 1.5% to about 12%, by weight, of propylene glycol monostearate and from about 0.25% to about 4%, by weight, of malic stearate.

12. A glyceride shortening composition which can be used in the preparation of recipe cake batters with single-stage mixing containing as additives from about 1.5% to about 12%, by weight, of propylene glycol monostearate and from about 0.25% to about 4%, by weight, of a mixture of citric acid monoglyceride and stearic acid.

13. A glyceride shortening composition which can be used in the preparation of recipe cake batters with single-stage mixing containing as additives from about 1.5% to about 12%, by weight, of propylene glycol monostearate and from about 0.25% to about 4%, by weight, of monostearoyl propylene glycol hydrogen succinate.

14. The process of preparing a shortening which can be used in the preparation of recipe cake batters with single-stage mixing which comprises dissolving in the liquid phase of a glyceride shortening composition as additives from about 1.5% to about 8%, by weight, of propylene glycol monostearate and from about 0.25% to about 4%, by weight, of behenic acid.

15. The process of preparing a shortening which can be used in the preparation of recipe cake batters with single-stage mixing which comprises dissolving in the liquid phase of a glyceride shortening composition as additives from about 1.5% to about 8%, by weight, of propylene glycol monostearate and from about 0.25% to about 4%, by weight, of malic stearate.

16. The process of preparing a shortening which can be used in the preparation of recipe cake batters with single-stage mixing which comprises dissolving in the liquid phase of a glyceride shortening composition as additives from about 1.5% to about 8%, by weight, of propylene glycol monostearate and from about 0.25% to about 4%, by weight, of a mixture of citric acid monoglyceride and stearic acid.

17. The process of preparing a shortening which can be used in the preparation of recipe cake batters with single-stage mixing which comprises dissolving in the liquid phase of a glyceride shortening composition as additives from about 1.5% to about 8%, by weight, of a mixture of propylene glycol monostearate and propylene glycol monobehenate and from about 0.25% to about 4%, by weight, of behenic acid.

18. The process of preparing a shortening which can be used in the preparation of recipe cake batters with single-stage mixing which comprises dissolving in the liquid phase of a glyceride shortening composition as additives from about 1.5% to about 8%, by weight, of 1,3-propanediol monostearate and from about 0.25% to about 4%, by weight, of stearic acid.

19. The process of preparing a shortening which can be used in single-stage batter mixing which comprises dissolving in the liquid phase of a glyceride shortening composition as additives from about 1.5% to about 8%, by weight, of propylene glycol monostearate and from about 0.25%, to about 4%, by weight, of monostearoyl propylene glycol hydrogen succinate.

References Cited in the file of this patent
UNITED STATES PATENTS

| | | |
|---|---|---|
| 2,508,393 | Jaeger | May 23, 1950 |
| 2,688,551 | Graham | Sept. 7, 1954 |
| 2,787,550 | Struble et al. | Apr. 2, 1957 |
| 2,815,285 | Holman et al. | Dec. 3, 1957 |
| 2,868,652 | Brock | Jan. 13, 1959 |

UNITED STATES PATENT OFFICE
CERTIFICATE OF CORRECTION

Patent No. 3,145,108                                              August 18, 1964

Norman Bratton Howard

It is hereby certified that error appears in the above numbered patent requiring correction and that the said Letters Patent should read as corrected below.

Column 3, line 57, after "ribitol" insert a comma; column 6, line 4, for "plycol" read -- glycol --; columns 11 and 12, TABLE IV, seventh column, line 29 thereof, for "3,355" read -- 1,355 --; column 13, TABLE VII, fourth column, line 2 thereof, for "0.96" read -- 0.95 --; same TABLE VII, third column, line 4 thereof, for "1,10" read -- 1.10 --.

Signed and sealed this 27th day of April 1965.

(SEAL)
Attest:

ERNEST W. SWIDER                                    EDWARD J. BRENNER
Attesting Officer                                          Commissioner of Patents